United States Patent [19]

Hornby et al.

[11] Patent Number: 4,831,600
[45] Date of Patent: May 16, 1989

[54] BOREHOLE LOGGING METHOD FOR FRACTURE DETECTION AND EVALUATION

[75] Inventors: Brian E. Hornby, Ridgefield; David L. Johnson, Danbury, both of Conn.

[73] Assignee: Schlumberger Technology Corporation, New York, N.Y.

[21] Appl. No.: 947,946

[22] Filed: Dec. 31, 1986

[51] Int. Cl.⁴ ............................................. G01V 1/40
[52] U.S. Cl. ...................................... 367/31; 367/35
[58] Field of Search ...................... 367/25, 31, 35, 28

[56] References Cited

U.S. PATENT DOCUMENTS

| | | | |
|---|---|---|---|
| 4,131,875 | 12/1978 | Ingram | 73/152 X |
| 4,562,557 | 12/1985 | Parks et al. | 367/38 X |
| 4,575,830 | 3/1986 | Ingram et al. | 367/31 X |
| 4,628,725 | 12/1986 | Gouilloud et al. | 73/19 |
| 4,633,449 | 12/1986 | Ingram et al. | 367/75 |
| 4,641,724 | 2/1987 | Chow et al. | 367/28 X |
| 4,672,588 | 6/1987 | Willen | 367/28 |

FOREIGN PATENT DOCUMENTS 0127548  5/1984  European Pat. Off. ............. 367/35

OTHER PUBLICATIONS

Seismic Prospecting for Oil; C. Hewitt Dix, Harper & Brooks, 1952, pp. 366–373.
"Mineralogy, Petrology, and Rock Mechanics"; Energy Research Abstracts; Jul. 1979; p. 3895; J. K. Dienes.
"Synthetic Microseismograms: Logging in Porous Formations"; J. H. Rosenbaum; Geophysics, vol. 39, pp. 14–38; Feb. 1974.
"The Correlation of Tube Wave Events with Open Fractures in Fluid-Filled Boreholes"; C. F. Huang et al.; pp. 361–376, 1981; Current Research.

*Primary Examiner*—Thomas H. Tarcza
*Assistant Examiner*—Tod R. Swann
*Attorney, Agent, or Firm*—Clifford L. Tager; David G. Coker; Louis H. Reens

[57] ABSTRACT

In a method for locating fractures in subsurface earth formations traversed by a borehole a first signal is generated representative of low frequency Stoneley waves (that is tube waves) propagating along the borehole from a source mounted in a logging tool. A second signal is generated by an array of detectors on the tool, representative of low frequency Stoneley waves propagating along the borehole and arising from reflection from fractures of the waves propagating from the source. An indication of the presence of fractures is derived by deconvolving the second signal with the first signal and identifying the time and magnitude of the peak value of the envelope of the deconvolved signal. The variation that would be expected in the presence of fracture and the actual variation are compared and a fracture detected when the actual and expected variations match. Alternatively the first and second signals can be cross-correlated and the time of the peak negative value of the cross-covariance determined.

The width of a fracture can also be found, by estimating the fracture reflectivity $R''$ for a range of possible fracture widths $w$ according to the equation $$R'' = |(wH_1^{(1)}(2\pi FSa))/(ia\sqrt{\alpha}\ H_0^{(1)}(2\pi FSa) - wH_1^{(1)}(2\pi FSa))|$$

where $H_n^{(1)}$ is the nth order outgoing Hankel function; F is Stoneley wave frequency; S is Stoneley wave slowness; a is the borehole radius; and $\alpha$ is a term related to borehole fluid viscosity (typically set equal to unity). The value of w yielding an estimated value of reflectivity closest to the value derived from the magnitude of the envelope of the deconvolved signal is taken as being indicative of the fracture width.

21 Claims, 11 Drawing Sheets

HORIZONTAL FRACTURE - RAW DATA

HORIZONTAL FRACTURE - REFLECTED STONELEY

SLANT STACKED TRACES

DIRECT/REFLECTING STONELEY ARRIVAL TIME DIFFERENCE

BOREHOLE LOGGING METHOD FOR FRACTURE DETECTION AND EVALUATION

BACKGROUND OF THE INVENTION

This invention relates to methods for detection and evaluation of fractures in earth formations by logging in a borehole penetrating the formations.

Fractures in earth formations are of major significance in the production of subsurface fluid resources such as hydrocarbons. In formations of low permeability and low porosity the potential production from a borehole into the formation is directly related to the number of open fractures. Secondary recovery of hydrocarbons (after production by the formation's inherent fluid pressure has been exhausted) involves the injection of fluids such as water to move hydrocarbons towards a producing well, and knowledge of the fractures in the formation in invaluable in predicting how injected fluids will behave. The strike, dip and density of subsurface fractures constitute valuable information in the search for hydrocarbon reservoirs in formations which have sustained complex deformation.

The current definitive source of information on fractures in the vicinity of a borehole is core samples obtained during drilling of the borehole. However, core sampling during drilling is an expensive procedure, and the subsequent analysis of the samples adds substantial additional expense and is time consuming. Furthermore, cores often cannot be obtained from formation intervals that are friable or densely fractured (precisely the sections of interest), and removal of the cores from the formation also removes them from the influence of the ambient downhole stresses, thereby altering or destroying stress-related characteristics in an unknown manner.

Borehole logging using measuring devices or sondes lowered into the borehole on an armored communications cable provides continuous measurements along extensive sections of the borehole under ambient stress conditions, at substantially less cost per foot than core analysis.

Various approaches to fracture detection and analysis using borehole logging techniques have been proposed. Thus an ultrasonic tool known as the borehole televiewer can be used to produce a visual representation of borehole wall reflectivity. However, it is difficult to produce good images on a reliable basis except in smooth-walled, nearly circular boreholes with a well-centered tool. Another, more recent, imaging tool measures electrical conductivity via arrays of buttons on two pads 90° apart and pressed against the borehole wall. Although this tool provides significant advantages over the borehole televiewer, including a wide range of detectable fracture sizes and good vertical resolution, the electrical nature of its measurement precludes its use in boreholes containing oil-based (nonconductive) drilling fluids. In addition, as presently configured, only a portion of the borehole wall is examined in a single pass through the borehole.

Non-imaging logging techniques that have been investigated for fracture detection include: sonic logging; dipmeter measurements; resistivity, induction and spontaneous potential logs; density compensation logs; and natural gamma ray logs.

U.S. Pat. No. 4,575,828 to Williams describes a technique for distinguishing between total formation permeability and fracture permeability, involving a comparison of the ratio of tube wave amplitudes measured by a pair of spaced apart receivers and the difference in tube wave travel times measured by the receivers. However, the location of fractured zones is not accomplished using tube wave measurements but rather by means of measurements of shear wave attenuation.

In a paper presented by Paillet at the SPWLA 21st Annual Logging Symposium in July 1980 and entitled 'Acoustic propagation in the vicinity of fractures which intersect a fluid-filled borehole', full waveform logs including tube wave amplitudes were compared with known characteristics of the logged borehole. Although some correspondence between fractures and tube wave amplitude was observed, no procedure for analyzing tube wave data to detect fractures was presented.

European patent specification No. 127,548 describes techniques for using data from three spaced receiving transducers to formulate quantities representative of formation complex compressibility and loss parameters attributable to formation characteristics. Information concerning the presence or absence of fractures can then be derived from logs of these quantities and parameters.

U.S. patent application Ser. No. 686,127 in the name of Hsu et al, assigned to the assignee hereof, and a paper 'A new method for fracture identification using array sonic tools' presented by Hsu et al at the 1984 SPE meeting, describe a method in which the energy of a selected wave component is calculated and displayed. When the selected component is a low frequency Stoneley wave, open fractures appear as a characteristic pattern on the display associated with Stoneley wave energy reductions caused by the fractures. Information on the fracture dip angle and fluid flow properties of the fracture may also be obtained.

Other techniques that have been reported include a study by Huang and Hunter, reported at the 51st annual SEG meeting in Los Angeles, 1981. In this work the occurrence of high-amplitude, low-velocity events in recordings of seismic energy originating from a shallow shot hole near the borehole was explained in terms of mode conversion at fractures leading to propagation of tube waves in both directions along the borehole away from the fracture locations.

There remains a need for a method of identifying and locating fractures by borehole logging, and of quantifying the characteristics of the identified fractures including their width.

SUMMARY OF THE INVENTION

According to one aspect of this invention there is provided a method for locating fractures in subsurface earth formations traversed by a borehole. A first signal is generated representative of low frequency Stoneley waves (that is tube waves) propagating along the borehole from a source of these waves, such as a source mounted in a logging tool placed in the borehole. A second signal is generated (for example using an array of detectors mounted on the tool) representative of low frequency Stoneley waves propagating along the borehole and arising from reflection (such as from fractures) of the waves propagating from the source. An indication of the presence of fractures is derived in accordance with a predetermined function of the first and second signals for a plurality of depths in said borehole, and a tangible record generated of the fracture indications.

The presence of fractures may be determined by deconvolving the second signal with the first signal and identifying the time and magnitude of the peak value of the envelope of the deconvolved signal. This time and magnitude will vary in a predictable manner with depth in the presence of a fracture, so the variation that would be expected in such a case and the actual variation can be compared and a fracture detected when the actual and expected variations match. The variation can be analyzed for example by means of (linear) least squares analysis as a function of depth. The magnitude of the peak value of the envelope of the deconvolved signal gives a measure of the reflectivity of the fracture.

The width of a fracture can also be found, by estimating the fracture reflectivity R" for a range of possible fracture widths w according to the equation $$R'' = |(wH_1^{(1)}(2\pi FSa))/(ia\sqrt{\alpha}\ H_0^{(1)}(2\pi FSa) - wH_1^{(1)}(2\pi FSa))|$$

where $H_n^{(1)}$ is the nth order outgoing Hankel function; F is Stoneley wave frequency; S is Stoneley wave slowness; a is the borehole radius; and a is a term related to borehole fluid viscosity (typically set equal to unity). The value of w yielding an estimated value of reflectivity closest to the value derived from the envelope of the deconvolved signal is taken as being indicative of the fracture width.

BRIEF DESCRIPTION OF THE DRAWINGS

Additional objects and features of the invention will become more apparent upon consideration of the following detailed description of the invention, reference being had to the accompanying drawings in which.

DETAILED DESCRIPTION

Figure 1:
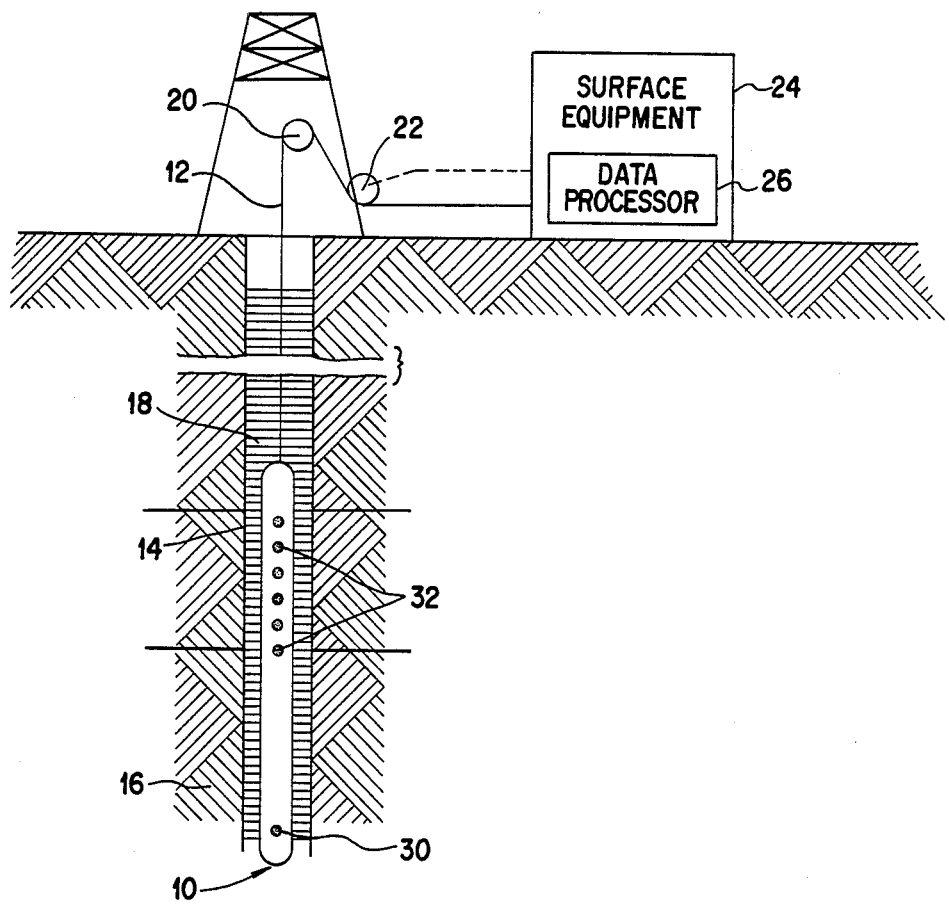
FIG. 1 is a schematic diagram of a borehole logging operation using a tool having an array of receivers for collecting data for use in accordance with this invention.

Referring to FIG. 1, an elongate logging tool or sonde 10 is suspended on an armored communication cable 12 in a borehole 14 penetrating an earth formation 16. The borehole 14 is filled with liquid 18 such as drilling mud used to stabilize the borehole wall and prevent escape of formation fluids up the borehole. The tool 10 is moved in the borehole 14 by paying the cable 12 out and reeling it back in over a sheave wheel 20 and a depth gauge 22 by means of a winch forming part of a surface equipment 24. Usually the logging measurements are actually made while the tool 10 is being raised back up the borehole 14, although in certain circumstances they may additionally or alternatively be made on the way down. The depth gauge 22 measures displacement of the cable 12 over the sheave wheel 20 and thus the depth of the tool 10 in the borehole 14.

The tool 10 is generally as described in U.S. Pat. No. 4,594,691 to Kimball et al and assigned to the assignee hereof. In particular, the tool includes an acoustic source 30 and an array of acoustic detectors 32 spaced along the tool and separated from the source 30. The number of detectors is typically between six and twelve. As the tool 10 is drawn up the borehole 14 the source 30 is operated repetitively to cause propagation of acoustic energy through the borehole 14 and the surrounding formation 16 to the detectors 32. Electrical waveform signals generated by the detectors 32 and representative of the received acoustic energy waveforms are sampled and digitized. These digitized signals are suitably conditioned by processing and interface circuitry in the tool 10 and transmitted up the cable 12 to the surface equipment 24. This equipment typically receives, decodes, amplified and records the signals on chart and/or magnetic tape recorders as a function of the depth signals generated by the depth gauge 22. In addition the equipment 24 may, as described below, analyze the data represented by these signals to yield indications of fractures which are also recorded. Further processing of these and other signals from the tool 10 enables the surface equipment 24 to monitor the operation of the tool 10 and generate signals which are transmitted down the cable 12 to control the tool 10, for example to synchronize the operation of its component circuits or modify circuit parameters such as amplifier gain.

The interval between successive operations of the source 30 is chosen to allow recording of waveforms of sufficient duration to include all components of interest before arrival of energy resulting from the next successive operation of the source 30. These components include the latearriving tube waves (low-frequency Stoneley waves), which one of the inventors hereof has observed at measurable levels at least 25 ms after source operation. Accordingly an ideal recording duration would be of the order of 40 ms. On the other hand usable results can be obtained according to the invention with waveform recordings 10 ms in duration.

The rate of operation of the source 30 will also depend on the rate at which the tool 10 is drawn up the borehole 14 and the desired distance between tool positions at which measurements are to be made. Thus for a measurement spacing of six inches at a logging speed of 1800 feet per hour, one trigger pulse per second suffices. A typical maximum trigger pulse rate is ten pulses per second. It is desired that the measurement spacing equal the spacing between detectors 32, by arranging that successive source operations occur after the tool 10 has moved a distance equal to the detector spacing, since this allows the use of analytical techniques which take advantage of the multiple redundant measurements obtained with an array of detectors.

The downhole equipment may include other tools in addition to the tool 10, such as a caliper device for measuring borehole diameter.

The surface equipment 24 typically incorporates a data processor 26 for coordinating and controlling the logging operation, and this processor may also be used for analysis of the recorded waveforms at the wellsite. Alternatively or in addition, the waveform recordings may be transferred to a remote location for subsequent more detailed analysis. In either case the analysis may proceed as shown in the flow diagram of FIGS. 2a to 2c. It will be understood by those skilled in the art that this analysis can be implemented, for example, by appropriate programming of a general purpose digital computer or by means of special purpose electronic circuitry.

Figure 2A:
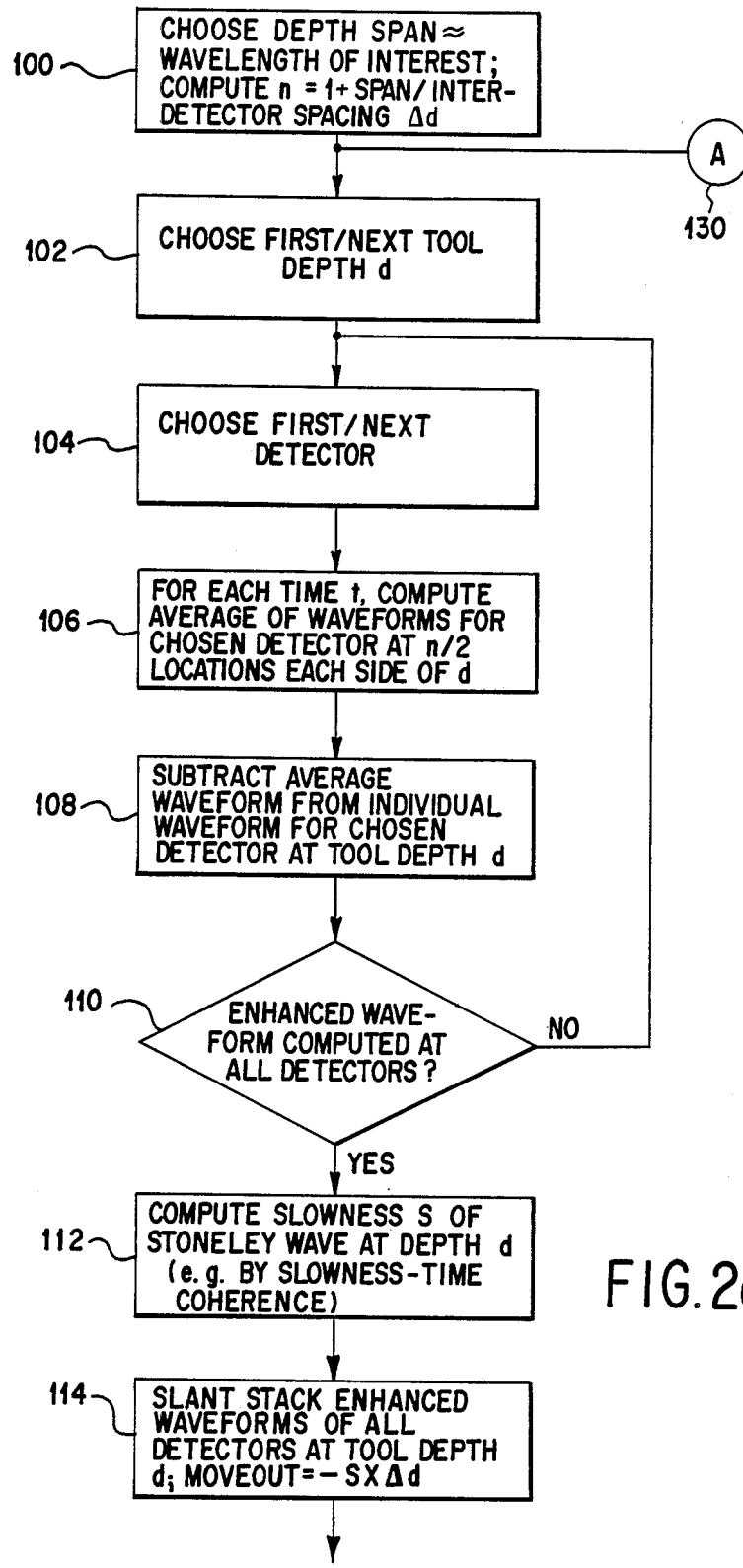
FIGS. 2a to 2c show a flow diagram of a method for fracture detection and evaluation in accordance with this invention.

Referring to FIG. 2a, the analysis commences at step 100 by choosing a depth span across the array of detectors 32 for deciding the number of waveforms to be included in subsequent steps of the procedure. The span is chosen to approximate the wavelength of the acoustic waveforms of interest, namely the tube waves, for which a typical wavelength is of the order of 5 feet. The number n of waveforms to be used is calculated by dividing the span by the spacing $\Delta d$ between detectors 32 in the tool array and adding one. Thus, assuming a spacing $\Delta d$ of six inches, the number n for a 5 foot wavelength would be equal to eleven.

Before the remainder of the processing, if desired, the portions of the recorded waveforms for times up to the time of arrival of signals travelling at the acoustic velocity of the borehole liquid 18 may be set to zero. Tube waves always travel more slowly than acoustic waves in the borehole liquid, so this procedure does not affect the tube wave signals and may reduce the effects of noise.

At step 102, for the first time this step is performed, the first (typically lowest) tool depth d at which waveforms were recorded is chosen. Likewise, the first time that the next step 104 is performed for a given depth d, the first detector (for example, the uppermost) in the tool array is selected. In the next step, 106, the procedure retrieves the waveform recorded from the selected receiver at depth d, together with the waveforms recorded from that same receiver at n/2 tool depths either side of the depth d. A digitized sample of a new average waveform is computed for each time t as the average of the amplitudes of the corresponding samples at that time t in the retrieved waveforms. Since the Stoneley wave velocity is dominated by the bulk modulus of the borehole liquid 18 (in the case of most formations likely to contain fractures), and this quantity is relatively constant, the arrival time of tube waves travelling directly from the source 30 to the selected detector 32 should not vary significantly over a short interval of the borehole 14. The averaging operation tends to emphasise components occurring at a constant time from waveform to waveform, so these direct tube waves will be enhanced in the averaged waveform.

The average waveform derived at step 106 is then subtracted at step 108 from the waveform for the selected receiver at depth d, to yield an enhanced waveform in which direct tube wave components are suppressed and thus components corresponding to reflected tube waves travelling past the detectors 32 back towards the source 30 are enhanced. At step 110 a test is made to determine whether this enhanced waveform has been computed for all the detectors 32 in the array for the current depth d, and if not the procedure returns to step 104 to select the next detector in the array and compute an associated enhanced waveform.

At step 112 a value for the slowness S (inverse of velocity, measured in $\mu s/ft$) of the tube waves at the depth d is computed. This may conveniently be accomplished using, for example, the technique for analyzing signals from arrays of detectors known as slowness-time coherence analysis, described in U.S. Pat. No. 4,594,691. This technique is applied to the waveforms derived from one detector 32 in the tool 10 over a section of the borehole at depth d. The waveforms may be first transformed into the frequency domain using a Fast Fourier Transform, and the frequency spectrum analyzed to determine a low frequency band where the detected tube wave signals have significant energy. The slowness-time coherence analysis is then performed for signals in this frequency band.

The slowness value thus derived is applied at step 114 and step 116 (FIG. 2b) to control the slant stacking of the enhanced waveforms produced at step 108 and of the original waveforms recorded by the detectors 32 while the tool 10 was at the currently chosen depth d. In step 114 the enhanced waveforms are stacked with a moveout equal to $-S \times \Delta d$ between waveforms from adjacent receivers. This emphasises components in the waveforms corresponding to acoustic phenomena travelling past the detectors 32 towards the source 30 with a slowness S—that is any reflected tube waves travelling back down towards the source 30. The stack in step 116 is applied to the original recorded waveforms with a moveout equal to $S \times \Delta d$, thereby emphasising components corresponding to tube waves travelling directly from the source 30 towards the detectors 32.

A spectral analysis of both sets of stacked waveforms is performed at step 118, for example using a fast Fourier transform (FFT), and the frequency F of the peak amplitude component in the frequency spectrum of the direct tube waves is identified. At step 120 the Fourier transforms of the two sets of slant stacked waveforms are used to deconvolve the stacked waveforms from step 114 (emphasising the reflected tube waves) with the stacked waveforms from step 116 (emphasising the direct tube waves).

The envelope of the deconvolved waveform derived in step 120 is computed at step 122, for example by means of the Hilbert and Fourier transforms (see for example Digital Signal Processing by Oppenheim and Schafer, 1975, p. 361)

A test is performed at step 124 to find whether the envelope has been computed for some predetermined minimum number of depths d. In the example shown in FIG. 2b, this threshold number is 40. If desired this threshold can be as low as 4 or 5, although a larger number will increase the confidence in any indications of fractures produced by the procedure. If the threshold number of computations has not been made, the procedure returns to step 102, via the connector A shown at 130, to choose the next tool depth d and perform steps 104 to 122 in respect to that depth.

When the envelope has been determined at step 122 for the required minimum number of tool depths d, the times $\Delta t$ of occurrence of the peak values of these computed envelopes are determined at step 126. Preferably each envelope peak is sought at the approximate time at which a reflected tube wave would be expected to occur at the depth for that envelope, after reflection from a fracture at some predetermined distance (for example six feet) above the depth d of the envelope for the uppermost depth. This approximate time is determined in accordance with the moveout of such a reflected wave travelling with slowness S. At step 128 the magnitude of each peak value is determined, to provide a value for a coefficient R of reflection of tube waves from any such fracture.

A linear least squares analysis is carried out at step 132 of the values of Δt as a function of depth. The number of values of Δt included in the analysis is typically the threshold number of the test in step 124, for example 40. The least squares analysis determines the best straight line approximation to the variation of Δt with respect to depth, and supplies as output the slope of this line and the value of Δt (intercept) where the extrapolated line intersects the abscissa (Δt axis).

A similar linear least squares analysis is also performed at step 132 of the values of the reflection coefficient R (from step 128) as a function of depth. The intercept of the best straight line fit to these values is taken as an improved estimate R' of the actual reflection coefficient (or reflectivity). To reduce the effect on this estimate of extreme and possibly unrepresentative values of R, such extreme values are excluded from the analysis, for example by discarding the five highest and five lowest values.

At step 134 (FIG. 2c) the tube wave slowness S determined at step 112 for the currently chosen depth d is retrieved, in preparation for testing whether a fracture exists at a predetermined distance D above the uppermost detector 32 with the tool 10 at this depth d. The value of D may be, for example, six feet. At step 136 the distance D and the retrieved value of S are used to estimate values for the slope and intercept of Δt that would be obtained at step 132 if the postulated fracture actually exists. The slope is estimated as $2 \times S$, and the intercept as $2 \times D \times S$.

These estimated values of slope and intercept are compared at step 138 with the values derived at step 132. The compared values are taken as being similar if the estimated slope is within ±10% of $2 \times X$ and the estimated intercept is within a range dependent on the slowness and spacing s between operations of the source 30. Specifically, the intercept should be within the range of $\pm(S \times s)$, that is $\pm\frac{1}{2}S$ for a spacing of six inches. If the compared values are closely similar, then the presence of a fracture at a depth $d-D$ is confirmed at step 140, and the procedure continues to step 142, to estimate the width w of the fracture. To this end, a series of calculations is performed, for different possible values w from 0.0001 inch to 1.0 inch, of a reflectivity R" according to the equation $$R'' = |(wH_1^{(1)}(2\pi FSa))/(ia\sqrt{\alpha}\ H_0^{(1)}(2\pi FSa) - wH_1^{(1)}(2\pi FSa))|$$

wherein $H_n^{(1)}$ is the nth order outgoing Hankel function;

F is the frequency found at step 118;

S is the tube wave slowness at depth d (from step 112);

a is the borehole radius (for example from a caliper measurement); and

α is a term related to the borehole fluid viscosity; for normal borehole fluids $\alpha \simeq 1$.

At step 144 the values of R" thus obtained are compared with the reflectivity value R' obtained at step 132, and the value of w corresponding to the value of R" closest to the value of R' is chosen as being indicative of the width of the fracture. The comparison at step 144 involves the absolute magnitude of the right-hand side of the expression for R". As an alternative a corresponding comparison involving phase information from that right hand side expression may be made, using phase information from the Fourier transform and deconvolution operations at steps 118 and 120.

The depth $d-D$, reflectivity R' and width w of the fracture are then output, for example to a chart or magnetic recorder, at step 146.

A test is then performed at step 148 to determine whether the waveforms over the complete range of depths d for which recordings were made have been analyzed. The procedure may also reach step 148 directly from step 138 if the test at step 138 finds that the estimated and derived values of Δt slope and intercept are not sufficiently close to indicate the presence of a fracture. If the test at step 148 shows that more waveforms remain to be analyzed the procedure returns via the connector A to step 102 to continue processing the waveforms for the next tool depth d. If on the other hand the test shows that all waveforms have been processed the procedure terminates at 150.

Figure 5:
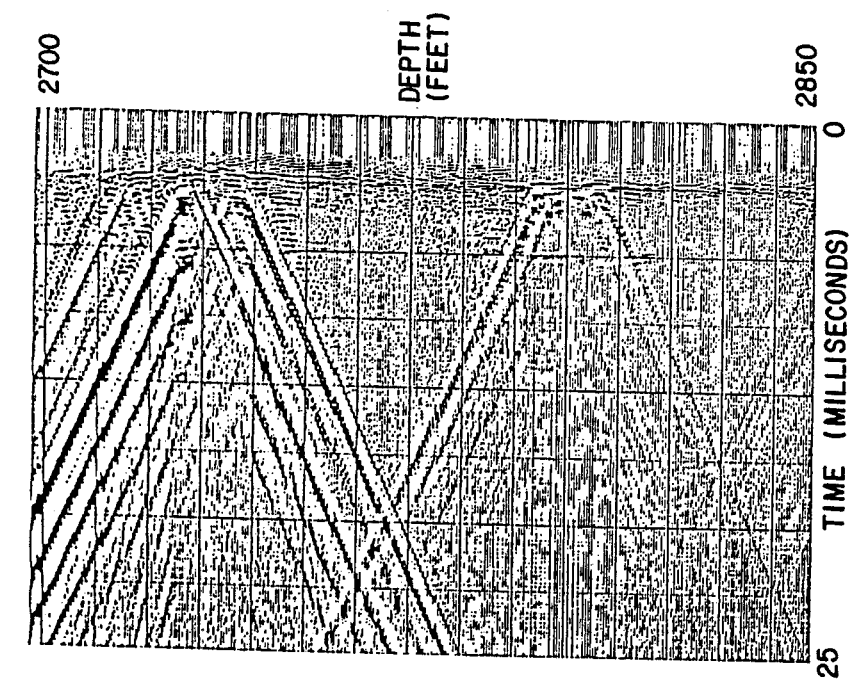
FIG. 5 shows the data of FIG. 4 after suppression of direct tube waves.
Figure 4:
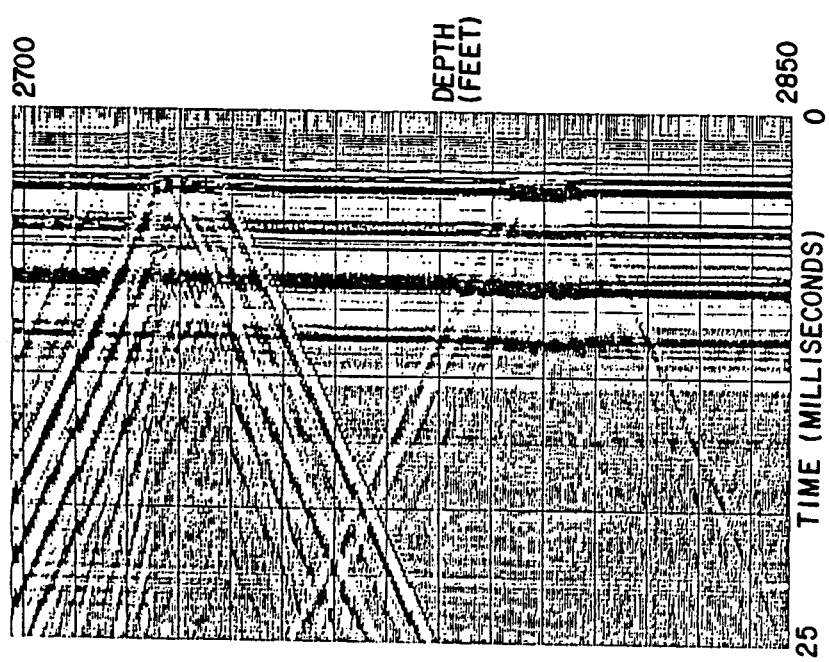
FIG. 4 shows as a function of depth raw data collected by one receiver in the logging operation of FIG. 1.
Figure 6:
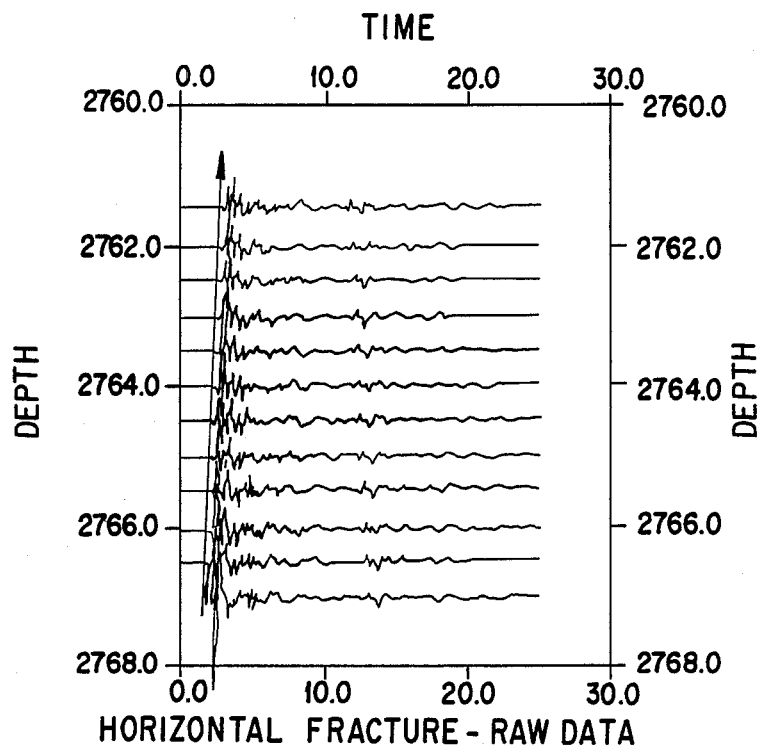
FIG. 6 shows raw data collected by all receivers at one tool location in the borehole in the logging operation of FIG. 1.
Figure 7:
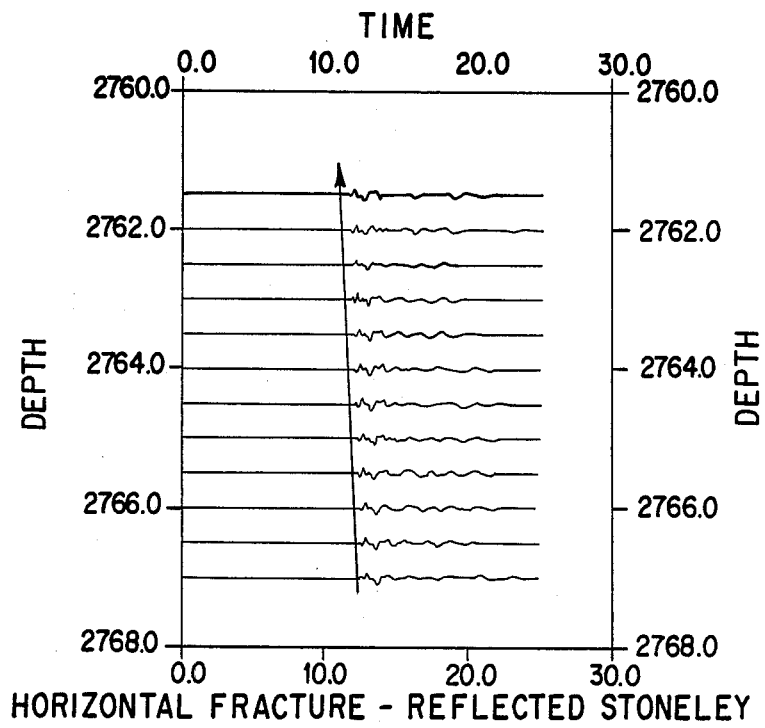
FIG. 7 shows the data of FIG. 6 after suppression of direct tube waves.

FIGS. 4 to 11 illustrate the results of various steps in the procedure described above with reference to FIGS. 2a to 2c. Thus, FIG. 4 shows waveforms as recorded by one detector 32 as a function of the depth of which they were obtained, while FIG. 5 illustrates the enhanced waveforms produced at step 108 by subtraction of the average waveform to suppress the direct tube waves. Likewise FIG. 6 shows the waveforms received from all detectors 32 at a single depth, and FIG. 7 shows these waveforms after suppression of the direct tube waves at step 108.

Figure 8:
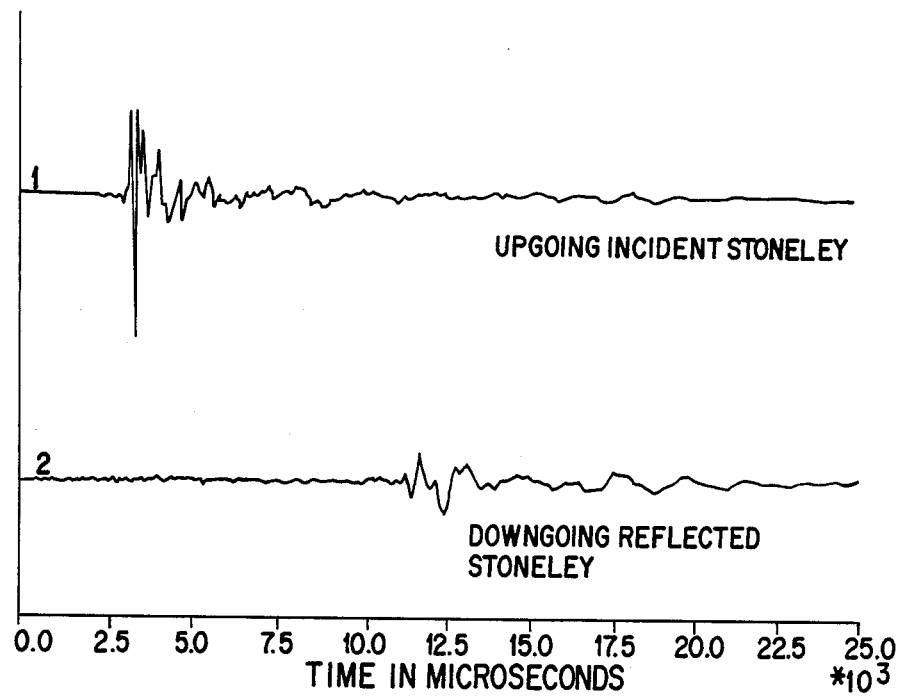
FIG. 8 shows the data of FIGS. 6 and 7 after slant stacking to emphasise direct and reflected (downgoing) tube waves respectively.
Figure 9:
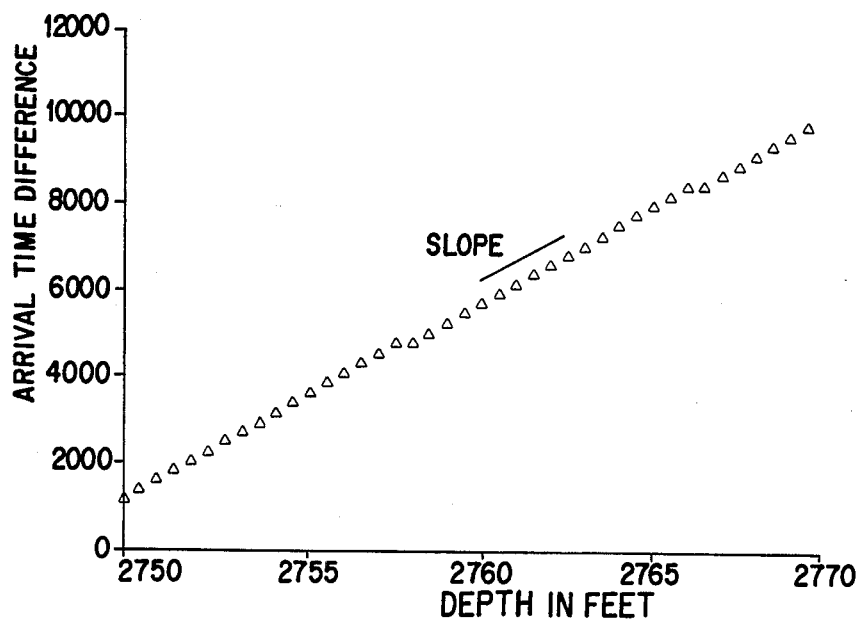
FIG. 9 illustrates a linear squares analysis.

FIG. 8 shows the stacked waveforms resulting from steps 114 and 116, and FIG. 9 illustrates in graphical form the linear least squares analysis procedure on the Δt values performed at step 132.

Figure 2B:
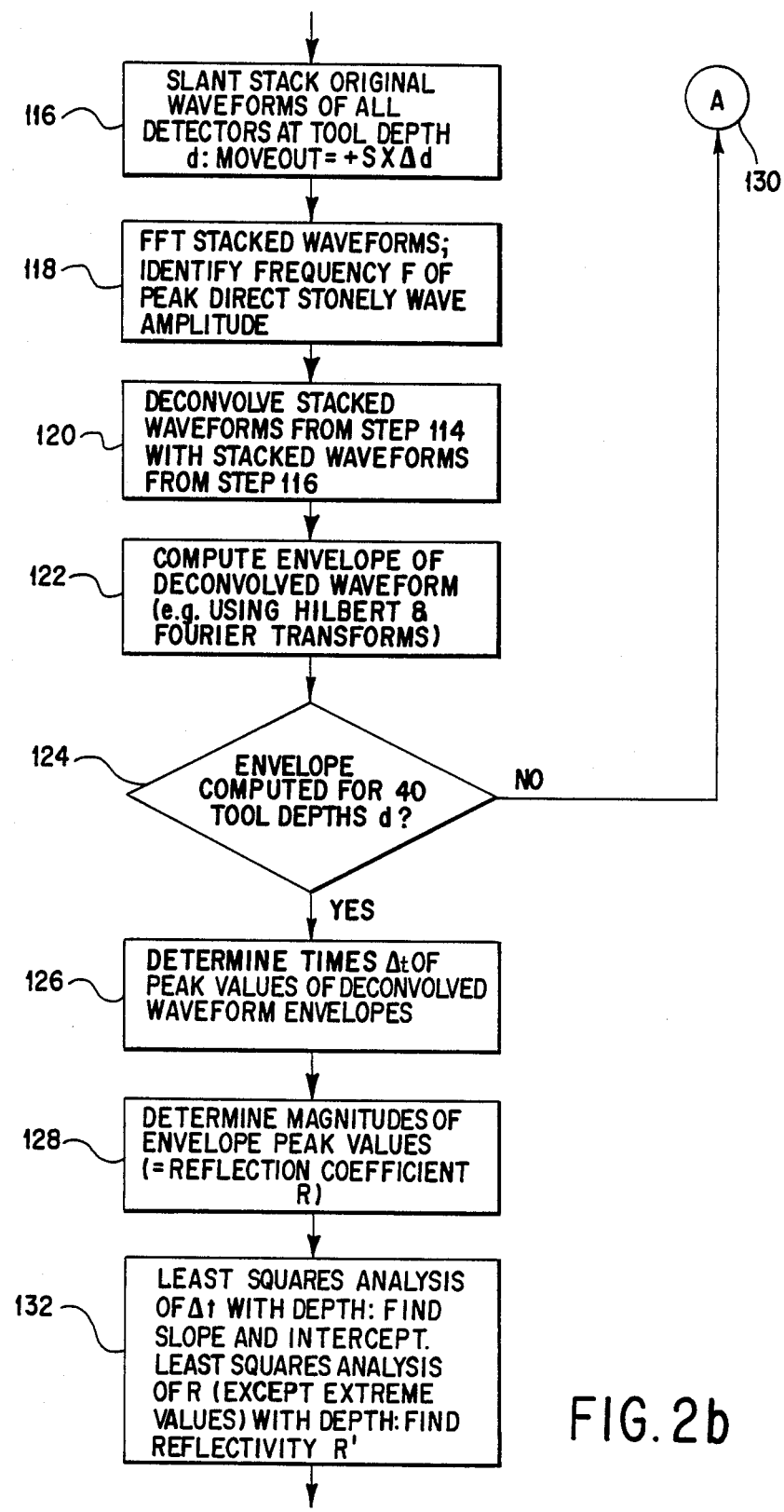
Figure 2C:
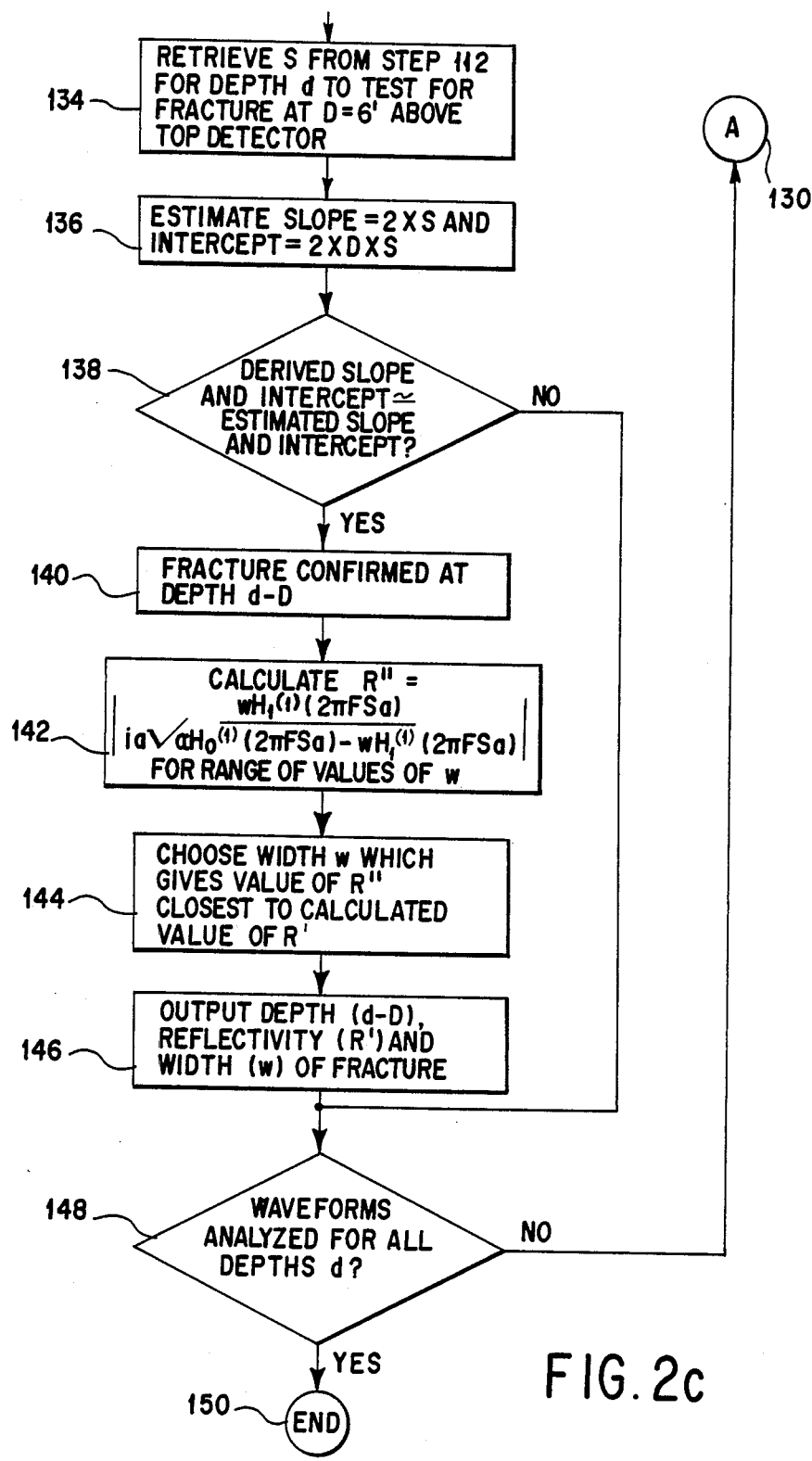
Figure 10:
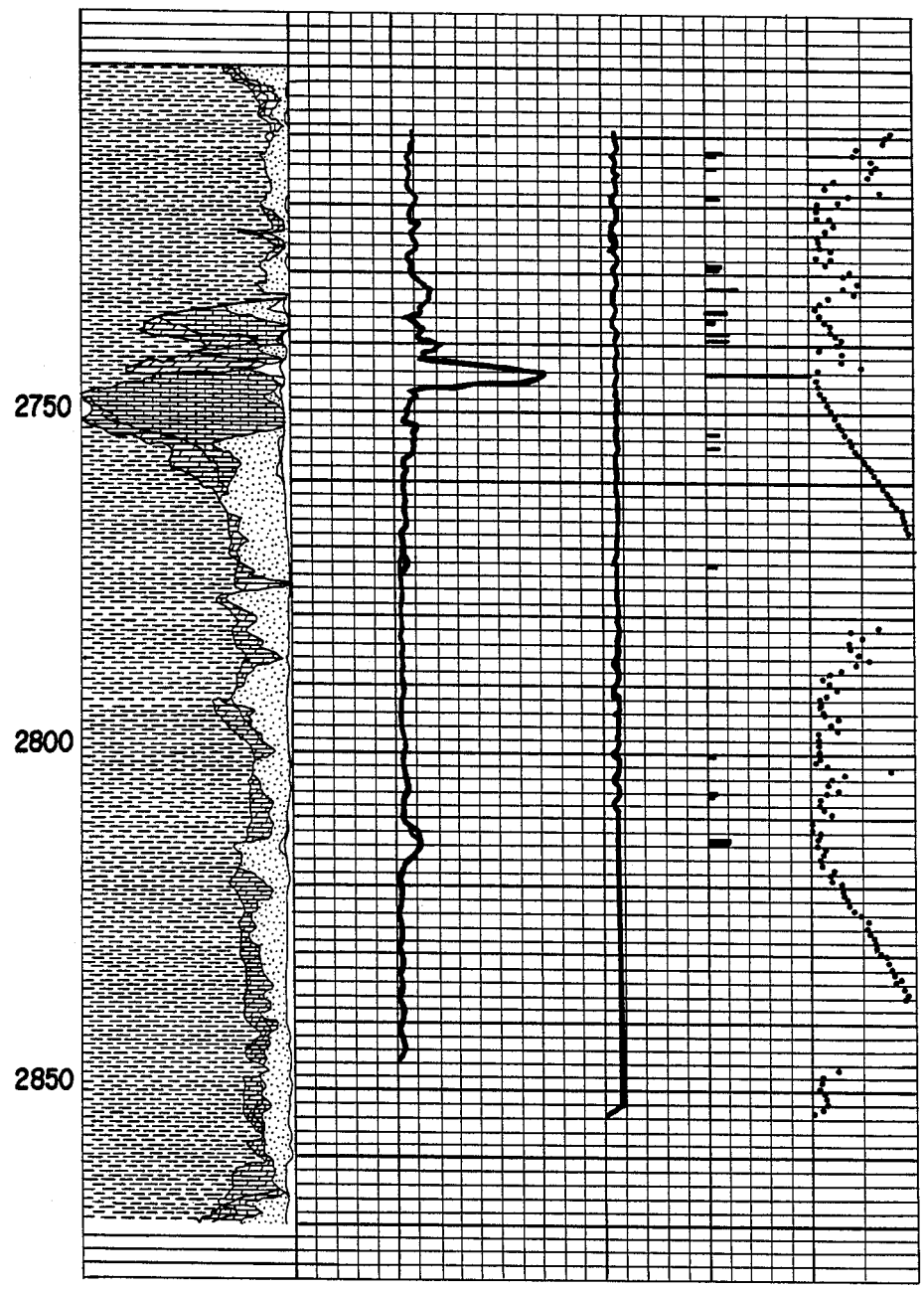
FIG. 10 shows a fracture log produced in accordance with the present invention.
Figure 11:
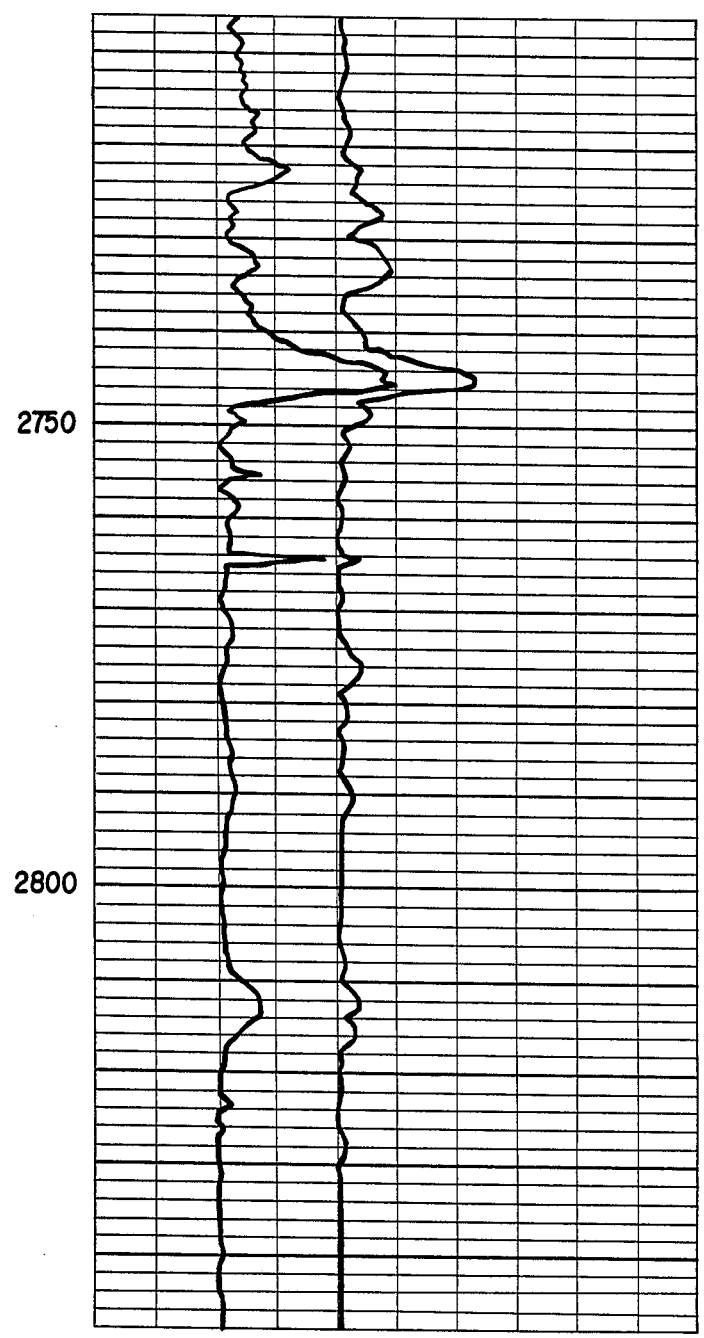
FIG. 11 shows another log produced in accordance with the present invention.

A typical recording or log of the results of the procedure shown in FIGS. 2a to 2c is shown in FIG. 10 in which depth is the vertical axis and the columns are, from left to right, an indication of lithology, a caliper measurement, the reflectivity R', the frequency F, the fracture width w and the time Δt. The large event just above the 2750 foot depth mark indicates a horizontal fractured bed boundary, while the smaller event just below 2800 feet is a dipping fracture. Further information can be gained by computing and displaying the reflectivity R' for different frequency ranges of the tube wave. Thus, as shown in FIG. 11, the left hand curve, computed for a frequency range centered on 600 Hz, tends to coarse detail, while the right hand curve, for a range centered on 2000 Hz, shows finer detail. In particular this second curve has a dip at 2814 feet, suggesting that the upper and lower boundaries of the fracture at that level (and therefore the fracture dip) are being identified.

Figure 3A:
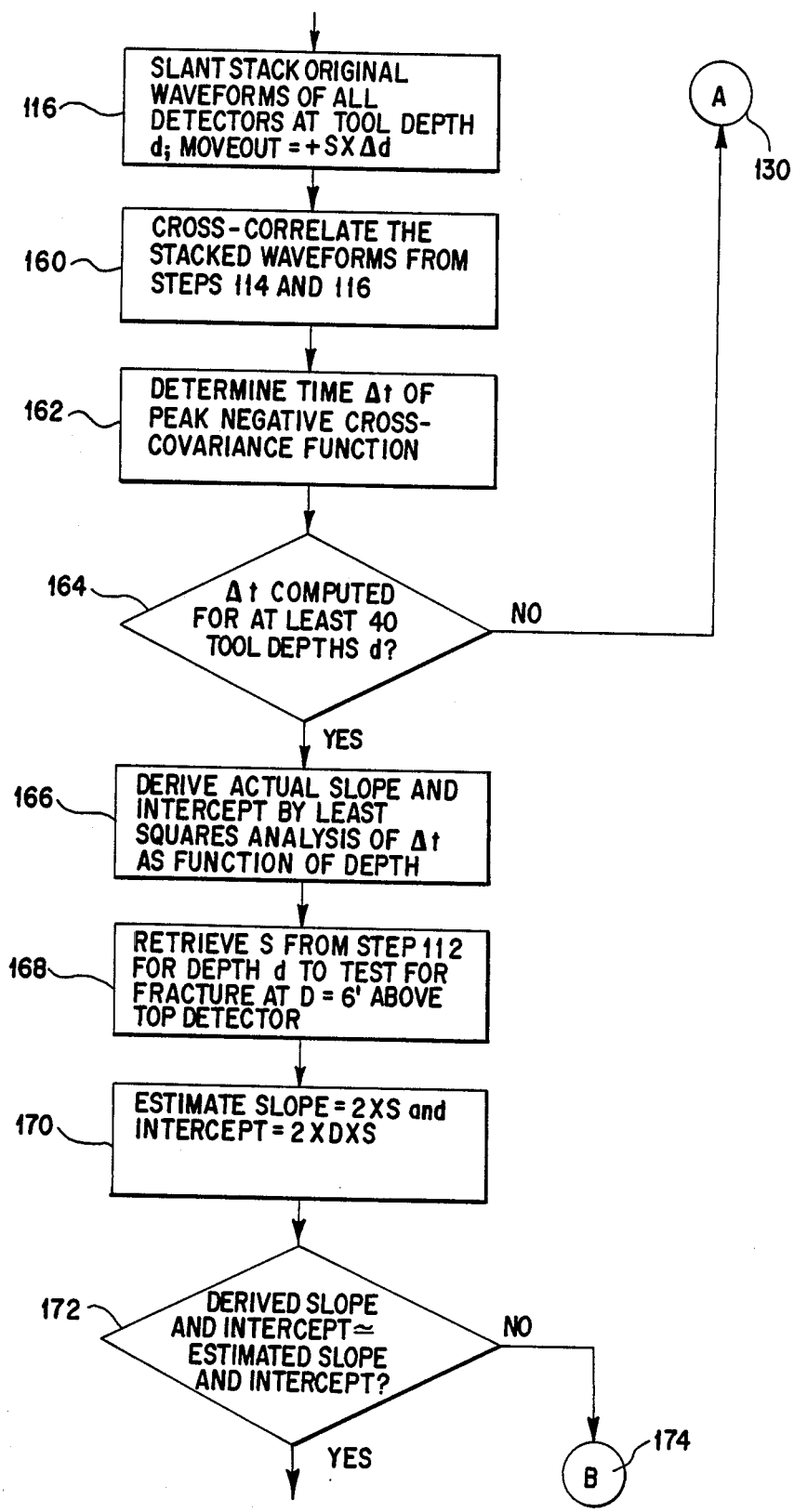
FIGS. 3a and 3b together with FIG. 2a show a flow diagram of another method for fracture detection and evaluation in accordance with this invention.
Figure 3B:
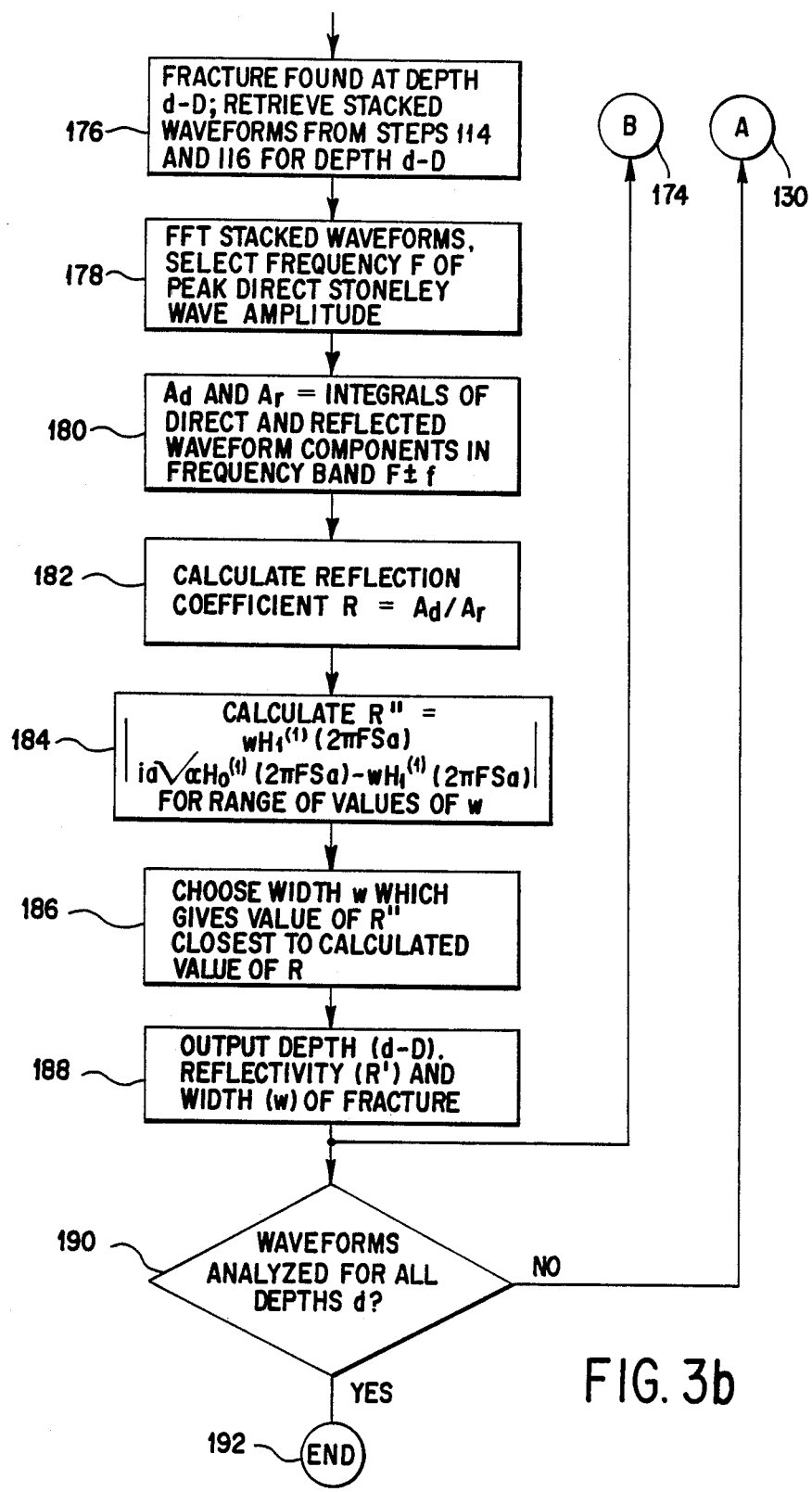

FIGS. 3a and 3b show a modification of the procedure of FIGS. 2a to 2c, in which cross-correlation of the slant stacked waveforms is used instead of deconvolution. The steps 100 to 114 of FIG. 2a are not changed and accordingly have not been repeated. Likewise step 116 of FIG. 3a is the same as step 116 of FIG. 2b.

Referring to FIG. 3a, the modified procedure continues after step 116 by cross-correlation at step 160 the stacked waveforms from steps 114 and 116. The cross-covariance function resulting from this step is examined at step 162 to find the time Δt of the peak negative value of the function. The negative peak is chosen since the tube wave undergoes a 180° phase inversion upon reflection from a fracture, leading to a negative covariance where the waves correlate. At step 164 the number of values of Δt is checked to see whether sufficient values have been computed to begin least squares analysis, as at step 128 of FIG. 2b. If not the procedure returns via the connector A to step 102. Otherwise the procedure continues to step 166 where least squares analysis is used to find the slope and intercept of the Δt values as a function of depth, as in the first part of step 132.

At steps 168 to 172 the tube wave slowness S computed at step 112 is retrieved and used to derive estimates slope and intercept values, and these are compared with the actual slope and intercept values, as in steps 134 to 138 of FIG. 2c. If the estimated and actual values are close enough, the procedure determines that a fracture has been found at step 176 (FIG. 3b) and retrieves the stacked waveforms produced at steps 114 and 116 for the depth d−D.

These stacked waveforms are Fourier transformed at step 178, for example using the FFT, and the frequency F of the peak amplitude component in the frequency spectrum of the direct tube wave is identified. At step 180 the components of the direct and reflected stacked waveforms within a frequency band F±f are integrated to produce values $A_d$ sand $A_r$ respectively. The half-bandwidth f may typically be 500 Hz. The ratio of the values $A_d$ and $A_r$ is computed at step 182 to determine the reflection coefficient R.

The remaining steps 184 to 192 correspond to the final steps 142 to 150 of the original procedure in FIG. 2c.

If the comparison of the estimated and actual slope and intercept values at step 172 does not yield a close enough match to indicate presence of a fracture, the procedure jumps straight to step 190 via the connector B referenced at 174.

There have been described and illustrated herein methods in accordance with the present invention for detection and evaluation in fractures by borehole logging. While particular embodiments of the invention have been described, it is not intended that the invention be limited thereby. Therefore it will be apparent to those skilled in the art that various changes and modifications may be made to the invention as described without departing from the spirit and scope of the appended claims.

We claim:

1. A method for locating a fracture in a subsurface earth formation traversed by a borehole, said method using an acoustic source and at least one acoustic detector traversing the borehole at a plurality of depths, said fracture positioned outside the direct path from the acoustic source to the at least acoustic detector, said method comprising the steps of:
   generating a first signal from the acoustic source, said first signal representative of Stoneley waves propagating in the borehole;
   receiving said first signal at the at least one detector, said first signal representative of Stoneley waves propagating in the borehole from the acoustic source to the at least one detector,
   receiving a second signal at the at least one detector, said second signal representative of reflections of said Stoneley waves, said reflections arising from an interaction of said Stoneley waves and the fracture; and
   combining said first and second received signals to derive a fracture signal indicative of a characteristic of the fracture.

2. The method of claim 1, including the step of deriving, from said first and second signals, reflections signals indicative of Stoneley wave reflectivity from fractures.

3. The method of claim 2, including the step of deriving width signals indicative of fracture widths.

4. The method of claim 3, including the step of calculating values of Stoneley wave reflectivity R'' for a plurality of values of fracture width w according to the equation $$R'' = |(wH_1^{(1)}(2\pi FSa))/(ia\sqrt{\alpha}\ H_0^{(1)}(2\pi FSa) - wH_1^{(1)}(2\pi FSa))|$$

where $H_n^{(1)}$ is the nth order outgoing Hankel function;
F is Stoneley wave frequency;
S is Stoneley wave slowness;
a is the borehole radius; and
α is a term related to borehole fluid viscosity;
and selecting the value of w yielding a calculated value of reflectivity closest to the derived fracture reflectivity as being indicative of the fracture width.

5. The method of claim 1, including the steps of detecting acoustic waves with a plurality of spaced receivers to generate waveform signals representative of Stoneley waves propagating in the borehole and extracting said first and second signals therefrom.

6. The method of claim 5, including the steps of generating a running average of signals representative of direct Stoneley waves propagating in the borehole at a plurality of adjacent depths, and subtracting said running average from said waveform signals to generate said second signals.

7. The method of claim 1, including the step of deriving from said second signal a value for the slowness of low frequency Stoneley waves propagating along said borehole within a predetermined low frequency band.

8. The method of claim 7, including the step of stacking said first signals for a plurality of adjacent depths with a movement dependent upon said slowness to produce a first signal stack, and stacking said second signals for a plurality of adjacent depths with an equal and opposite moveout to produce a second signal stack.

9. The method of claim 1, including the step of determining the time of occurrence of correlated events in said first and second signals.

10. The method of claim 9, including the step of deconvolving said second signal with the said first signal to produce a deconvolved signal having peaks representative of fractures.

11. The method of claim 10, wherein said time of occurrence is determined as being the time of a peak value of the envelope of said deconvolved signal.

12. The method of claim 10, including the step of determining the magnitude of values of the peaks in the envelope of said deconvolved signal as being indicative of fracture reflectivity.

13. The method of claim 9, including the step of cross-correlating said second signal and said first signal to produce a cross-covariance signal with peaks representative of fractures.

14. The method of claim 13, wherein said time of occurrence is determined as being the time of a peak negative value of said cross-covariance signal.

15. The method of claim 9, including the step of determining shifts between different linear alignments of said times of occurrences associated with different depths by applying a least squares analysis to variations of said times of occurrences with depth.

16. The method of claim 15, including estimating the value of the result of said least squares analysis that would be obtained for a fracture at a predetermined distance from the depth at which said first and second signals were obtained.

17. The method of claim 16, including the step of comparing said result of said least squares analysis and said estimated result of said least squares analysis to detect the presence of a fracture at said predetermined distance.

18. The method of claim 1, including the step of deriving an indication of fracture width w according to the equation $$R'' = (wH_1^{(1)}(2\pi FSa))/(ia\sqrt{\alpha}\ H_0^{(1)}(2\pi FSa) - wH_1^{(1)}(2\pi FSa))$$

where $H_n^{(1)}$ is the nth order outgoing Hankel function;
F is Stoneley wave frequency;
S is Stoneley wave slowness;
a is the borehole radius; and
$\alpha$ is a term related to borehole fluid viscosity.

19. The method of claim 1, wherein said fracture signal is indicative of the location of the fracture.

20. The method of claim 1, wherein said fracture signal is indicative of a dimensional characteristic of the fracture.

21. The method of claim 1, wherein said method includes a plurality of acoustic detectors, each of said detectors receiving said first and said second signals.

* * * * *